United States Patent

[11] 3,620,241

[72] Inventor  Ross M. Brown
              Palos Verdes Estates, Calif.
[21] Appl. No. 60,409
[22] Filed     Aug. 3, 1970
[45] Patented  Nov. 16, 1971
[73] Assignee  Desalination Systems Inc.
              Escondido, Calif.

[54] COMBINATION PLUMBING FIXTURE FOR WATER PURIFICATION SYSTEM HAVING WASTE BYPASS FLOW
10 Claims, 4 Drawing Figs.

[52] U.S. Cl. ............................................. 137/216,
                                               137/801, 137/594
[51] Int. Cl. ............................................. E03c 1/10
[50] Field of Search.. ................................. 137/216,
                                        217, 560, 594, 595, 801

[56]              References Cited
                 UNITED STATES PATENTS
3,183,923   5/1965   Henrikson .................... 137/216

3,455,324   7/1969   Bieri et al. ..................... 137/216

Primary Examiner—Henry T. Klinksiek
Attorney—Thomas D. Lane

ABSTRACT: In a water purification system wherein a supply of pressurized, potable, product water is to be dispensed as required, and a small volume flow of nonpressurized byproduct waste water is to be discharged to a potentially contaminated drain, a combination plumbing fixture comprises a body with a valve-controlled passage therethrough for dispensing the potable water. A pair of axially upright ducts are provided through a faucet body, the lower end of one of the ducts being connected to receive the flow of waste byproduct water, and the lower end of the other duct being connected to the drain. A recess in the body encompasses the upper ends of both ducts, and a gooseneck tube is fitted into the upper end of said one duct and discharges the waste water in a free fall into the other duct. A vent opening in the other duct provides an antisiphon airgap.

PATENTED NOV 16 1971    3,620,241

INVENTOR.
ROSS M. BROWN

BY Thomas D. Lane

ATTORNEY

3,620,241

COMBINATION PLUMBING FIXTURE FOR WATER PURIFICATION SYSTEM HAVING WASTE BYPASS FLOW

BACKGROUND OF THE INVENTION

In some types of small production water desalination or purification systems, such as, for example, a reverse osmosis system having a capacity of several gallons a day for drinking and cooking purposes, it is common practice to provide a pressure tank for holding a required supply of the processed water, and to dispense this water as required through a suitable faucet. However, such systems also produce a small, continuous outlet flow of waste byproduct water, and this waste water is customarily disposed of through a drain line discharging into a sewer system.

In order to thus dispose of the waste water, laws and ordinances usually require, and common precaution demands, that such waste line be provided with an adequate airgap or vent which will positively prevent sewage from being syphoned back into the line which supplies to the system the water to be treated. An airgap of at least 1 inch in such drain line, and at a specified height, is a common requirement, and to meet this requirement approved airgap vent fixtures are available for mounting on a sink or drainboard, usually well back from the faucet which dispenses the product water.

Such an airgap fixture not only adds to the cost of the apparatus, but also requires the drilling on an additional hole in the sink or drainboard to receive it, and additional installation procedure to install it, and comprises an additional obstruction on the sink or drainboard which must be kept clean throughout the life of the installation.

PURPOSE OF THE INVENTION

A primary objective of this invention is to provide in a single fixture means for the controlled dispensing of potable product water from a purified water supply system, together with an airgap of selected length in a conduit for disposing of a low volume flow of waste byproduct water to a potentially contaminated drain.

The invention provides a combined plumbing fixture for a water purification system which produces not only a supply of pressurized, potable product water, but also a relatively small amount of waste byproduct water, the fixture having a body with a mounting base for mounting on a sink or drainboard, with a potable pressurized product water supply tube sealed to the lower end of a valve controlled passage entering the body through the base, and extending through the body for dispensing the product water, and having also a small diameter waste water inlet duct opening into the fixture body through its base, said duct being connected at its lower end to the waste water outlet from the system, and a larger diameter upright outlet duct opening into the body through the base, the upper ends of both ducts communicating with the atmosphere and with each other through overflow means so that waste water from the system flowing upwardly through the inlet duct flows by gravity into the open upper end of the larger second duct for gravity, nonpressurized flow downwardly therethrough, the lower end of the second duct being in sealed communication with a potentially contaminated drain, the second duct having a vent therein opening to the atmosphere.

BRIEF DESCRIPTION OF THE DRAWINGS

The objectives and advantages of the invention will be apparent from the following description and the accompanying drawings, wherein.

DETAILED DESCRIPTION

Figure 1:
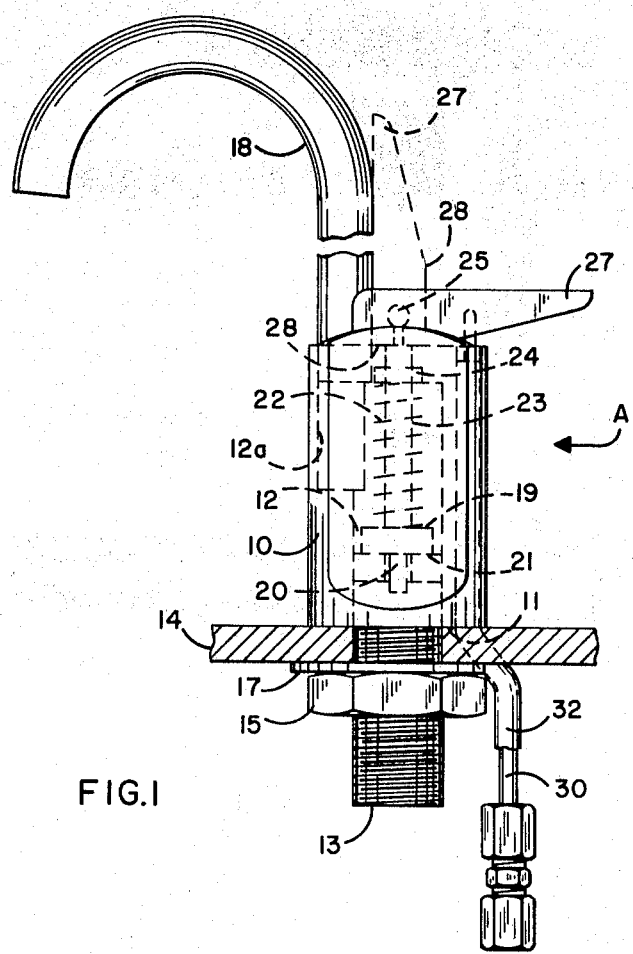
FIG. 1 is a side elevational view of a carafe-filling combination plumbing fixture embodying the invention, a small fragment of a sink drainboard being shown in section, internal structure being shown diagrammatically in broken lines, portions being broken away.
Figure 2:
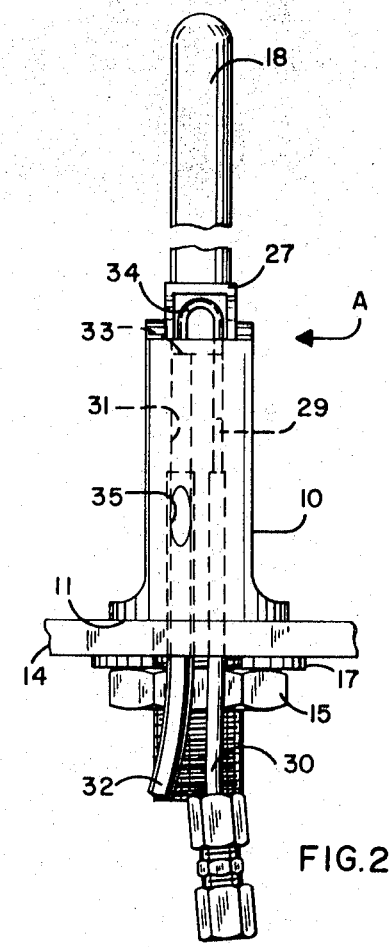
FIG. 2 is a rear elevational view of the structure shown in FIG. 1.
Figure 3:
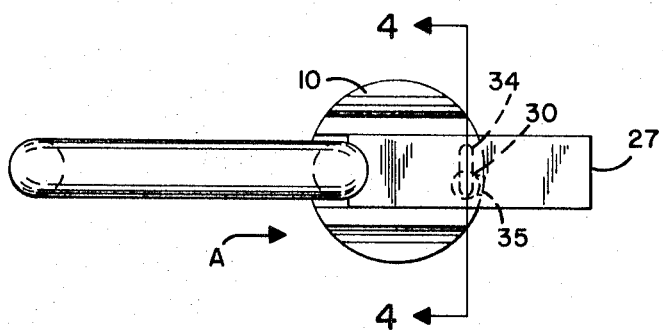
FIG. 3 is a top plan view of the structure shown in FIGS. 1 and 2.

Referring to the drawings in detail, a plumbing fixture A embodying the invention comprises a body 10, which may be of brass, preferably polished and chrome plated, and is designed for mounting upright on its base 11. A passage 12 for potable, pressurized water from a reverse osmosis or other water purification system, not shown, with which the fixture A is to be used, opens into the body through its base 11. A tube or nipple 13 is screwed in sealed relation into the threaded lower end of the passage 12, and is adapted to be connected in a conventional manner to the pressurized potable water supply of the system for which the fixture is intended.

For mounting the fixture A the potable water supply tube 13 is inserted through a suitable hold provided in a sink drainboard 14 in a well-known manner, and the fixture A is held firmly in upright position on its base by tightening a usual compression nut 15 screwed onto the threaded tube 13 to cause an interposed washer 17 to bear against the under side of the drainboard 14.

Into the upper end of an offset portion 12a of the passage 12 a usual gooseneck faucet spout 18 is fitted and sealed, as by soldering. A conventional poppet valve 19 seats on a valve seat surrounding a flow opening 20 axially through a disk 21 sealed coaxially in the water passage 12. The valve 19 is biased toward its seat by a coil spring 22, which surrounds the stem 23 of the valve 19 and is held in compression between the head of the valve 19 and the body 10. The valve stem is fitted for axial movement in a hole provided in the body, and an O-ring 24 seals the valve stem to the body.

The upper end of the valve stem is secured to a short transverse pin 25, which is rotatively mounted in a valve-actuating lever 27. The lever 27, which is of rectangular inverted-U cross section, has flat lower edges 28 which are located adjacent, but not bearing on, the upper end of the body 10 when the valve 19 is seated on its seat. Tilting the free end of the valve lever 17 either up or down raises the valve from its seat to allow pressurized product water to flow through the faucet passage 12 and out the spout 18. The valve can be left in open position by swinging the lever 27 to its upright position shown in broken lines in FIG. 1.

For disposing of the waste byproduct water from the water purification system for which the invention is intended, a small, generally upright inlet duct 29 is provided, as by drilling, through the body 10, the lower end of this duct being located within the base 11, and its upper end being exposed to the atmosphere through the top of the body. The waste water inlet duct 29 preferably is counterbored from its lower end so as to have a larger diameter lower portion. A byproduct water inlet tube 30 is fitted into the lower portion of this duct 29 and sealed, as by soldering.

A second, preferably larger diameter waste outlet duct 31 is also provided through the body 10 alongside the inlet duct 29. The lower end of the latter duct also is located within the base 11, and the duct preferably is axially upright when the fixture A is mounted on its base 11 for use. This outlet duct 31 also is counterbored from its lower end, and a drain tube 32 is fitted therein and sealed as by soldering. In order to provide for these ducts 29 and 31 the body 10 is of sufficient thickness on at least one side of the passage 12 to admit them without danger of penetrating the product water passage 12. Also, if required, the washer 17 is notched on one side to receive them.

Figure 4:
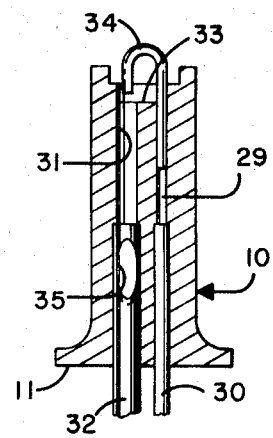
FIG. 4 is a sectional view taken along line 4—4 of FIG. 3, parts being omitted.

A recess 33, best shown in FIG. 4, is provided in the top of the fixture body 10 which encompasses the upper ends of both ducts 29 and 31 and thereby lowers the barrier of body material between the ducts to form a weir, so that water welling out of the top of inlet duct 29 will be retained by this recess and will flow over the weir thus formed and down through the outlet duct 31. The recess is centered on a plane containing the axis of both ducts, and is of a width at least at the inlet duct end thereof, to receive the curved portion of a gooseneck tube 34 in fitted relation therein.

Although the fixture A is operable without it, the small bore gooseneck tube 34 preferably is fitted into the upper end of the inlet duct 29 to discharge the waste water from the inlet tube axially downwardly into the outlet duct 31. This gooseneck tube is not soldered in place, since any slight leakage will simply flow over the weir mentioned in the preceding paragraph. The gooseneck tube prevents any possibility of a surge overflow. The straight, longer and of the gooseneck tube 34 is inserted sufficiently far into the duct 29 so that the short, discharge end of the gooseneck is spaced upwardly a short distance from the upper end of the outlet duct 31, and since the stream discharged from the gooseneck tube is substantially smaller than the upright outlet duct, such stream falls free into the latter duct.

A vent opening 35, preferably of substantially greater area than the cross-sectional area of the bore of the outlet tube 31, is provided through the wall of the outlet tube and the fixture body 10 to the atmosphere. The lower end of the vent opening 35 is spaced downwardly from the short, discharge end of the gooseneck tube 34 by a desired or code-required airgap distance. The airgap provided by the spacing of the discharge end of the outlet tube and the free-falling stream from the gooseneck tube 34 prevents any suction or siphon action which may be applied to the waste water inlet tube 30 from drawing potentially contaminated liquid from the outlet tube 32 into a water supply to which tube 20 may be connected.

In the event that the combination fixture A requires servicing, the valve-controlled passage 12 and the valve 19 therein, being of conventional design, will be serviced in a well-known manner. In the event that the waste water disposal features of the fixture A require servicing, the valve control lever 27 may be flipped to upright position alongside the faucet spout 18 as shown in broken lines in FIG. 1, and the gooseneck tube 34 withdrawn, thereby exposing the ducts 29 and 31. Any obstruction can then either be flushed out by fresh water or a suitable solvent introduced through the upper ends of the ducts 29 and 31, or dislodged by means of a suitable probe in a manner that will be apparent to ordinarily capable maintenance personnel. The gooseneck tube 34 can then be reinserted in the inlet duct 29 and the valve lever 27 flipped down to its normal, solid line position, ready for use.

In its normal position the lever 27 covers and conceals the gooseneck tube 34, and since the vent opening is inconspicuous the incorporation of the dual functions in the fixture does not mar or noticeably change its appearance from that of a simple faucet.

The invention provides in a single fixture, costing little if any more than the dispensing faucet alone, a highly effective combined faucet and airgap drain fixture which meets code requirements. simplifies installation, and maintenance, and reduces cost.

Having now fully disclosed my invention, I now claim and desire to secure by Letters Patten, the following:

1. A combination plumbing fixture for dispensing on demand a supply of pressurized product water, and disposing to a potentially contaminated drain a relatively low volume flow of waste water at atmospheric pressure, comprising:

a fixture body having a valve-controlled passage for pressurized product water extending therethrough, and having also a duct-receiving portion on at least one side of said product water passage of sufficient thickness to admit a pair of ducts therein.

an inlet duct extending upwardly through such body portion to the atmosphere, an outlet duct extending upwardly through such body portion to the atmosphere, means directing waste water flowing through the inlet duct into the upper portion of the outlet duct for free gravity flow downwardly therethrough, the outlet duct having a vent opening therein a specified airgap distance below the point at which the water from the inlet duct is directed into the outlet duct, means connecting an end of the product water passage in sealed relation to such supply of pressurized, product water from such system, means connecting the lower end of the inlet duct in sealed relation to such flow of waste water, and means connecting the lower end of the outlet duct to a potentially contaminated drain.

2. A plumbing fixture as claimed in claim 1 wherein at least the upper portion of the outlet duct for a selected distance is vertical when the fixture is mounted in a predetermined position, and the vent opening is in the vertical portion of the outlet duct.

3. A plumbing fixture as claimed in claim 1 wherein the body has a flat base, and the fixture is designed for mounting with the flat base mounted upon a horizontal supporting surface.

4. A pluming fixture as defined in claim 1 wherein a gooseneck tube comprising two straight side portions and an interconnecting curved portion has one of said straight side portions fitted into the upper end of the inlet duct and its other side portion directed downwardly axially into the outlet duct, the outlet duct having an internal diameter sufficiently large to permit a stream of waste water from the gooseneck tube to fall free therein for such specified airgap distance.

5. A fixture as defined in claim 4 wherein the lower end of said passage and of both of said ducts is within the base.

6. A plumbing fixture as claimed in claim 5 wherein the means connecting the lower end of the potable water passage to the supply of pressurized water comprises a straight, threaded tube for inserting through a hole in a supporting drainboard, a compression nut is provided for screwing onto the threaded tube to grip the drainboard, and the means for connecting the lower end of the ducts comprises a small-diameter bendable tube fitted in sealed relation into the lower end of each duct to pass through the same hole in the drainboard laterally beyond the compression nut.

7. A plumbing fixture as claimed in claim 1 wherein a recess is provided in the upper end of the body encompassing the upper ends of both ducts and lowering the body material between said ducts to form a weir.

8. A fixture as claimed in claim 1 wherein a tube having at least one straight side portion and a curved portion has said one side portion fitted into the upper end portion of the inlet duct, and the other end thereof directed downwardly axially into the outlet duct, such other end having an outlet opening therein substantially smaller than the outlet duct so that a stream of waste water discharged from such outlet opening falls free, axially into the outlet duct, the vent opening to the atmosphere being located such specified airgap distance below such outlet opening.

9. A fixture as claimed in claim 8 wherein a valve-actuating element overlies and substantially conceals the curved portion of the gooseneck tube.

10. A fixture as claimed in claim 8 wherein a narrow recess is provided in the top of the body and encompasses the upper ends of both ducts, said recess being centered on a plane containing the axis of both ducts, the recess being of a width through at least a part of its length to receive the curved portion of the gooseneck tube in fitted relation therein.

* * * * *